United States Patent [19]
Alim et al.

[11] Patent Number: 5,387,432
[45] Date of Patent: Feb. 7, 1995

[54] METHOD FOR MAKING METAL OXIDE VARISTORS COATED WITH PASSIVATING COATING

[75] Inventors: Mohammad A. Alim, Medina; Karen C. Beal, Peninsula, both of Ohio

[73] Assignee: Hubbell Incorporated, Orange, Conn.

[21] Appl. No.: 265,061

[22] Filed: Jun. 28, 1994

Related U.S. Application Data

[62] Division of Ser. No. 209,919, Mar. 14, 1994.

[51] Int. Cl.$^6$ .............................................. H01C 7/10
[52] U.S. Cl. .................. 427/101; 427/376.2; 338/21
[58] Field of Search ............... 427/101, 376.2; 338/21

[56] References Cited

U.S. PATENT DOCUMENTS

| | | |
|---|---|---|
| 3,938,069 | 2/1976 | May . |
| 3,959,543 | 5/1976 | Ellis . |
| 4,042,535 | 8/1977 | May ..................................... 252/518 |
| 4,046,847 | 9/1977 | Kresge ................................. 264/61 |
| 4,490,014 | 12/1984 | Levinson ........................ 427/101 X |
| 4,495,482 | 1/1985 | Phillip ............................. 427/101 X |

OTHER PUBLICATIONS

Abstract of Japanese Patent 58-74539 dated May 6, 1983.
Abstract of Japanese Patent 53-78048 dated Jul. 11, 1978.

*Primary Examiner*—Karl Group
*Attorney, Agent, or Firm*—Jerry M. Presson; Robert H. Berdo

[57] ABSTRACT

There is disclosed a passivating coating composition suitable for application as a collar to metal oxide varistor valve block cylindrical surfaces comprising a mixture of 64–74 parts by weight of a glass powder, 22–35 parts by weight of water, and 0.5–2 parts by weight of an additive comprising fumed silica, clay and urea.

8 Claims, 1 Drawing Sheet

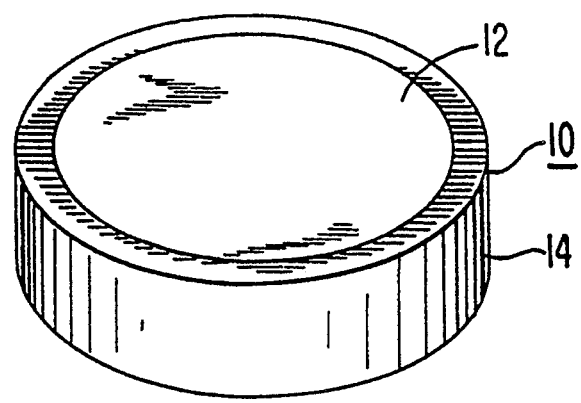

METHOD FOR MAKING METAL OXIDE VARISTORS COATED WITH PASSIVATING COATING

This is a division of application Ser. No. 08/209,919 filed Mar. 14, 1994.

BACKGROUND OF THE INVENTION

This invention relates to a passivating coating or collar material for metal oxide varistors (MOVs) which are primarily zinc oxide and which are useful in a valve block of a surge arrester. This invention also relates to metal oxide varistors with a passivating coating and to a method of making metal oxide varistors with a passivating coating.

Surge arresters are used to protect electrical equipment against insulation damage resulting from voltage surges which exceed the normal operating voltage of the equipment. Typically, an arrester includes a valve section and a gap section in series inside a cylindrical insulating housing. The valve section is made up of one or more metal oxide, primarily zinc oxide, varistor disks stacked face-to-face. Each of the disks of the arrester is generally provided with a passivating coating material about the periphery, or collar, to improve its stability via preventing flashover, surface conduction, corona effect, tracking, etc. under high electrical surges (e.g., switching transients, lightning, etc.) and temporary over-voltages (TOV). The passivating material is generally a ceramic material coated on the peripheral surface of the disk to provide a ceramic collar material. The ceramic based collar material must provide:

1. isolation of the MOV surfaces from the immediate environment and prevention of gas or particle diffusion;
2. high mechanical strength and/or elastic properties;
3. higher resistivity than the MOV valve block at maximum continuous operating voltage (MCOV);
4. similar dielectric constant to that of zinc oxide (i.e., $\approx 8.5$ for MOV at extremely high electrical stress in the upturn region of the current-voltage characteristic);
5. similar thermal properties with polycrystalline zinc oxide based MOVs (i.e., thermal/heat conductivity, thermal expansion, heat diffusivity, specific heat, etc.); and
6. compact adhesion and nearly no variation in the physical gap between the collar and the MOV surfaces at any stress level.

U.S. Pat. No. 3,959,543, the disclosure of which is incorporated herein by reference, discloses a sintered zinc oxide, non-linear resistance surge arrester disk provided with a glass anti-flashover collar having a relatively low fusing temperature and a relatively low coefficient of thermal expansion. The glass comprises the following constituents in proportion to one another by weight: about 44.5% lead oxide; about 24.5% zinc oxide; about 20.5% boric oxide; about 4.5% silicon oxide; and about 6.0% cupric oxide. In making the disk, the zinc oxide composition in powdered form is pressed into a disk shape with a diameter of about 3.4 inches and a thickness of somewhat over 1 inch to form a blank. This blank is then sintered by firing in air at a temperature of about 1200° C. for about five hours. Thereafter, it is cooled at about 100° C. per hour, and a slurry of finely divided glass particles, having the composition as described above and mixed with ball clay to hold the glass in suspension, is applied to the outside surface about the perimeter of the disk. The disk with the applied slurry is then fired again in air at a temperature of between 640° C. and 650° C. for about 30 minutes to cause the glass particles in the slurry to fuse to one another and to the disk to form a collar.

U.S. Pat. No. 3,938,069, the disclosure of which is incorporated herein by reference, discloses a metal oxide varistor that includes a sintered body portion composed essentially of a metal oxide and a plurality of preselected additives. Surrounding the body portion is a passivating coating. The passivating coating preferably comprises at least some of the preselected additives. More specifically, there is described a varistor which can be fabricated from 98 mol percent zinc oxide, 0.5 mol percent bismuth oxide, 0.5 mol percent cobalt oxide, 0.5 mol percent manganese oxide, and 0.5 mol percent titanium oxide. The oxides of bismuth, cobalt, manganese and titanium are thoroughly mixed in equal molar amounts, then heated and cooled to form a crystalline solid body. The crystalline solid body is ground to form a "reaction product". Zinc oxide and the reaction product are thoroughly mixed, and the mixture is pressed and sintered to form the varistor body. The passivating coating may comprise the aforementioned reaction product alone, or in combination with other additives such as additional bismuth oxide, $H_3BO_3$, $Sb_2O_3$ and $SiO_2$. It will be appreciated that when the passivating coating comprises the reaction product by itself, it will contain, based on molar amounts, 25% $Bi_2O_3$, 25% $CO_2O_3$, 25% $MnO_2$ and 25% $TiO_2$.

The abstract of Japanese Patent No. 58-74539 discloses a vitreous composition comprising 15–35 weight percent $B_2O_3$, 7–22 weight percent ZnO, 0–5 weight percent $V_2O_5$, 19–39 weight percent $Bi_2O_3$ and 19–39 weight percent $Tl_2O$.

The abstract of Japanese Patent No. 53-78048 discloses a glass-coated thick-film resistor comprising a thick-film resistor element coated with a low temperature crystallized glass consisting of 45–70 weight percent PbO, 5–35 weight percent $Bi_2O_3$, 10–30 weight percent ZnO, 5–15 weight percent $B_2O_3$ and 2–10 weight percent $SnO_2$.

SUMMARY OF THE INVENTION

In accordance with this invention, there is provided a passivating coating composition for application as a collar to metal oxide varistor valve block cylindrical surfaces. The base material is a non-lead containing glass composition comprising either (1) $Bi_2O_3$, ZnO and $B_2O_3$, or (2) $Bi_2O_3$, ZnO, $B_2O_3$ and $V_2O_5$. A modifying additive is added to each of these glass compositions, the additive comprising commercial grade syloid (fumed silica), bentonite and urea. The additive is added to the glass composition in an amount up to about 2% by weight of the entire composition. When applied as a collar to a metal oxide varistor valve block, the coating composition provides a narrow physical interfacial gap with the MOV surface via an excellent contact adhesion, and good resistance to thermal, electrical and mechanical shock. The glass surfaces formed on the MOV peripheral surface appear to prevent in-diffusion (to the MOV block) and out-diffusion (from the MOV block) of volatile species, and surface corrosion/reaction processes at normal operating experimental conditions. These characteristics make the materials highly suitable for applications in air and nitrogen atmospheres. The performance is not adversely affected in non-air environments, such as $SF_6$, oil, etc. No degradation/deterioration or failure of these collar materials is observed when the MOV valve block is subjected to an elevated temperature (115° to 130° C.) at an AC/DC bias, with 5-10% above the maximum continuous operating voltage (MCOV) for at least 1,000 hours in any of the aforementioned atmospheres. A typical procedure for making the collar material is to prepare a sprayable slurry comprising deionized water and/or an inorganic binding liquid, one of the aforementioned glass materials and the additive. The slurry is thoroughly mixed by means of a high shear mixer. The slurry is then applied to the MOV surface and cured. Since the glass composition does not contain lead, it is safer to handle in the manufacturing operations than lead containing glass. The softening temperature of the glass composition is in the vicinity of 460° C. The coating composition is curable as a solid composite in the range of 545° C.-625° C.

BRIEF DESCRIPTION OF THE DRAWING

FIG. 1 is an elevational view of a metal oxide varistor having a collar provided in accordance with this invention.

DETAILED DESCRIPTION OF THE INVENTION

A sintered metal oxide varistor disk 10 is shown in FIG. 1. The disk is of sintered zinc oxide containing, as impurities, minor amounts of other compounds as well known in the art such as shown in U.S. Pat. Nos. 3,959,543 and 3,938,069. The disk is provided with an electrode 12 on each face thereof, only one of which is shown in FIG. 1. About the outer perimeter of the disk is a passivating collar 14 which is provided as follows: a glass composition is provided comprising either (1) from about 35% to about 45% by weight of $Bi_2O_3$, from about 25% to about 35% by weight of ZnO, and from about 25% to about 35% by weight of $B_2O_3$ or (2) from about 35% to about 45% by weight of $Bi_2O_3$, from about 22.5% to about 30% by weight of ZnO, from about 22.5% to about 30% by weight of $B_2O_3$, and from about 5% to about 10% by weight of $V_2O_5$. The specific composition may be chosen from the aforementioned ratios to suit the processing conditions in conjunction with the leakage/non-linear resistance of the MOV disk to which the collar is applied. The ratios of the ingredients in the glass composition must not degrade the actual electrical properties and influence resulting performance of the MOV valve block.

The aqueous coating composition comprises 64-74 parts by weight of one of the aforementioned glass powders having a particle size below 45 μm, between 22-35 parts by weight of deionized water, and 0.5-2 parts by weight of an additive comprising fumed silica, clay (bentonite) and urea in an approximate weight ratio among themselves of 2:1:1, respectively. The ratios of ingredients in the additive are flexible and may vary by about 10% by weight of each. For instance, the ratio of silica:clay:urea could be 2.1:1:1; or 2:1.1:1; or 2:1:1.1; or 2.1:1.1:1, etc. The fumed silica and clay aid in suspending the glass particles and in modifying the viscosity of the slurry. The urea aids in drying at room temperature.

A typical procedure for making the aqueous collar material is to add the fumed silica, clay and urea to the glass powder and deionized water, and then to thoroughly mix by means of a high shear mixer. The resultant slurry is applied by spraying to the MOV disk 10 to a thickness depending upon the diameter of the MOV valve block. Typically, this thickness varies in the range of 0.3-1.3 mm. The essential spraying parameters of the resultant slurry are:

1. specific gravity ranging from 1.9-2.1;
2. non-newtonian fluid viscosity in the range of 3500-6500 cps;
3. application temperature of 18°-37° C. for air pressure ranging from 30-70 psi; and
4. an average quantity of collar mix sprayed on the MOV peripheral surface ranging between 0.055-0.085 $g/cm^2$.

The slurry will cure to form a solid composite, generally above 460° C., depending upon time and temperature. The compositions described are curable in the temperature range of 545°-625° C., depending on the time (typically 1 to 3 hours, depending on the MOV formulation and processing methods) of annealing or post-heat treatment requirement of the sintered MOV block. In this temperature range, the resulting composite glass forms enhanced composite adhesion with the MOV block surfaces. Also, time of annealing above three hours in this temperature range is not detrimental to the properties and purposes of the collar on the MOV peripheral surface. Typical thermal expansion for these glass materials ranges from between 5.5×10 E-6 and 6.5×10 E-6 cm/cm-C., and relative dielectric constant between 7 and 10 (at 1 MHz, 20° C.).

The resulting glass collar material enhances contact adhesion with the MOV peripheral surface. The mechanical hardness also increases via the flow of the glass and its compaction upon finishing. Thus, the glass collar system exhibits a reduced physical interfacial gap with the MOV surfaces and good resistance to thermal, electrical and mechanical shock. No degradation/deterioration or failure of this collar material is observed when the MOV valve block is subjected to an elevated temperature (5- 12% above 115° C.) at an AC/DC bias, with 5-10% above the MCOV for at least 250-1,000 hours.

The disk 10, which has been provided with collar 14 in accordance with this invention, may be incorporated into an over-voltage surge arrestor as one of a number of arrester-valve disks as described in U.S. Pat. No. 3,959,543.

The following example illustrates the practice of this invention.

EXAMPLE 1

A passivating coating composition is prepared by admixing 68.50 parts by weight of one of the aforementioned glass compositions, an additive containing 0.40 part by weight of fumed silica, 0.20 part by weight of clay, and 0.20 part by weight of urea, and 30.70 parts by weight of deionized water. The composition is thoroughly mixed by means of a high shear mixer. A sintered metal oxide varistor disk having the following composition in mol percent is provided: 93-97% ZnO and 3-7% additive comprising $Bi_2O_3$; $Sb_2O_3$; CoO or $Co_2O_3$ or $Co_3O_4$; MnO or $MnO_2$; $Cr_2O_3$; NiO; $B_2O_3$; $SiO_2$; $Al(NO_3)_3.9H_2O$ etc. These compositions may be found in U.S. Pat. Nos. 3,959,543; 4,046,847; and 4,042,535, the disclosures of which are incorporated herein by reference. The disk is coated on the periphery thereof by spraying the passivating coating composition to a thickness of 0.5 millimeter. The thus coated metal oxide varistor is then heated to a temperature of 600° C. for two hours to form a collar on the varistor disk having enhanced contact adhesion.

What is claimed is:

1. A method for manufacturing a zinc oxide varistor disk having a glass collar around the periphery thereof which comprises the steps of providing a zinc oxide varistor disk, applying as a passivating coating to the periphery of said disk a coating composition comprising a mixture of 64–74 parts by weight of a glass powder, 22–35 parts by weight of water, and 0.5–2 parts by weight of an additive comprising fumed silica, clay and urea, and then curing.

2. A method as defined in claim 1 wherein said glass powder comprises a mixture of from about 35% to about 45% of $Bi_2O_3$, from about 25% to about 35% by weight of ZnO, and from about 25% to about 35% by weight of $B_2O_3$.

3. A method as defined in claim 1 wherein said glass powder comprises a mixture of from about 35% to about 45% by weight of $Bi_2O_3$, from about 22.5% to about 30% by weight of ZnO, from about 22.5% to about 30% by weight of $B_2O_3$, and from about 5% to about 10% by weight of $V_2O_5$.

4. A method as defined in claim 1 wherein the approximate weight ratio of fumed silica:clay:urea is 2:1:1.

5. A method as defined in claim 2 wherein the approximate weight ratio of fumed silica:clay:urea is 2:1:1.

6. A method as defined in claim 3 wherein the approximate weight ratio of fumed silica:clay:urea is 2:1:1.

7. A method as defined in claim 1 wherein said water is deionized water.

8. A method as defined in claim 1 wherein the particle size of said glass powder is below 45 μm.

* * * * *